May 8, 1934.　　　　F. McMANIS　　　1,957,791
PIPE PAINTING DEVICE
Filed March 7, 1930　　　2 Sheets-Sheet 2

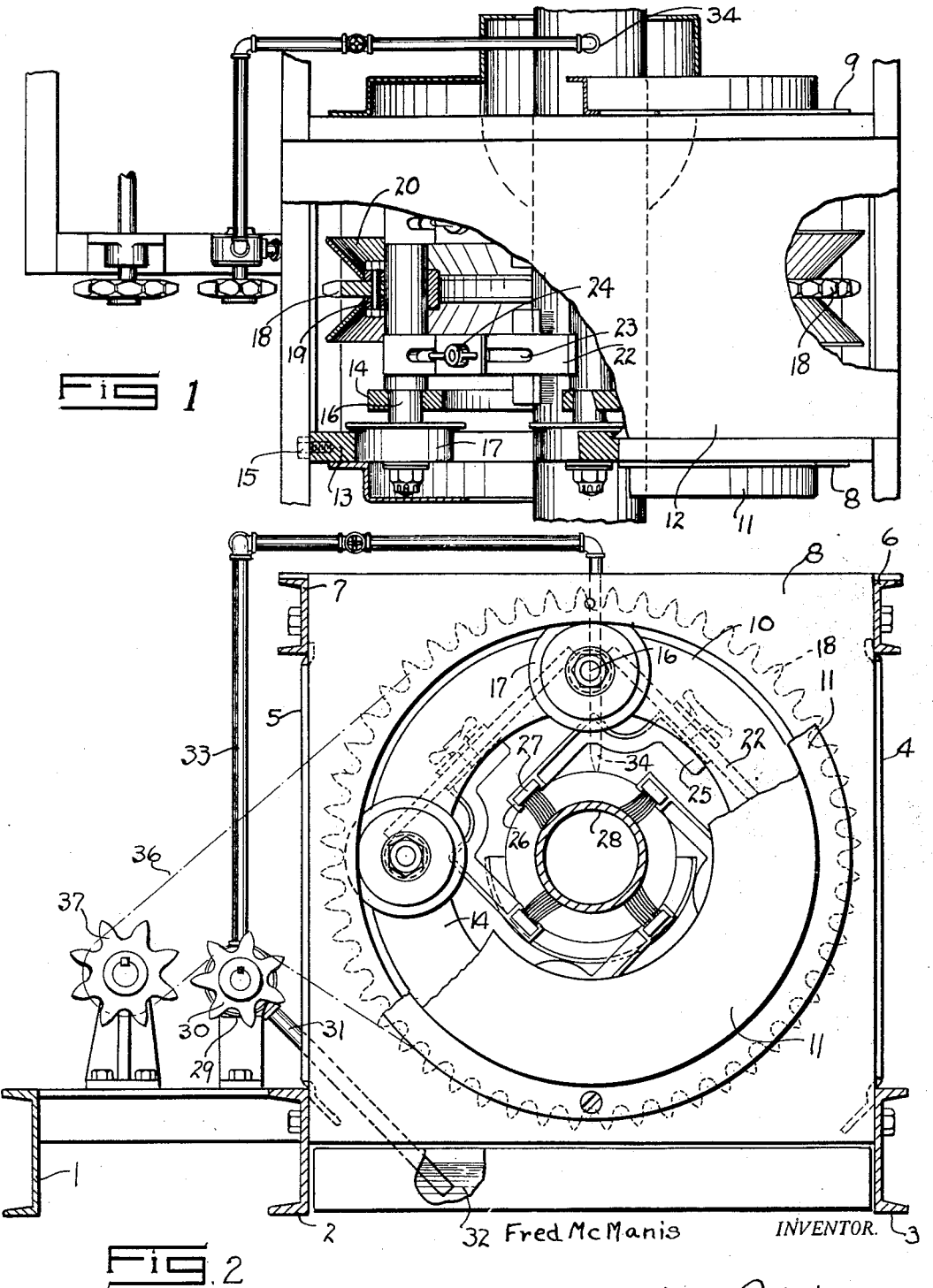

Fred McManis　INVENTOR.

BY Jesse R. Stone
&
Lester B. Clark

ATTORNEYS

Patented May 8, 1934

1,957,791

UNITED STATES PATENT OFFICE 1,957,791

PIPE PAINTING DEVICE

Fred McManis, Houston, Tex., assignor to W-K-M Company, Inc., Houston, Tex.

Application March 7, 1930, Serial No. 433,902

7 Claims. (Cl. 91—25)

This invention relates to devices for applying paint or other coating to pipes to prevent corrosion and disintegration of the pipe in use.

It is an object of the invention to provide a mechanically operated device for applying a coating mixture to pipes to prevent deterioration of the pipe due to corrosion, electrolysis and the like.

It is a further object of the invention to provide a mechanical device for applying paint or coating to the pipes and in which the brushes or other elements used in applying the coating are adaptable for different sizes of pipe and also to make up for wear in the brushes. It is desired that the brushes be easily adjustable when necessity arises.

It is also an object to provide a strong and substantial arm for supporting the coating-applying devices and to so mount said devices that they will be held firmly in proper position in the operation of the machine.

In the drawings herewith, Fig. 1 is a top plan view of a pipe-coating device constructed in accordance with the invention, certain parts being broken away for greater clearness.

Fig. 2 is a side view largely in elevation illustrating the device shown in Fig. 1.

Figure 3:
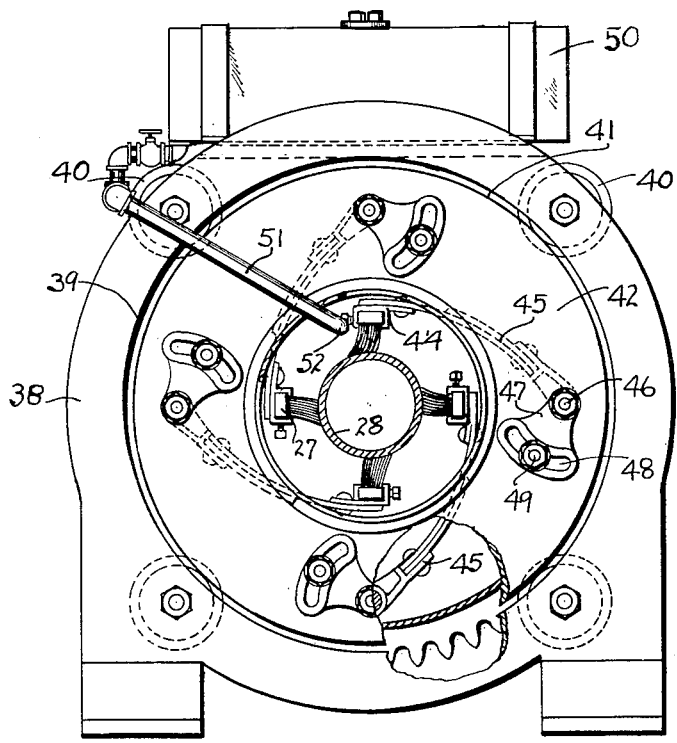
Fig. 3 is a side elevation of a pipe painting device showing a slightly different embodiment and Fig. 4 is a front elevation of the device shown in Fig. 3, parts of the casing being broken away.

This device is adapted to be employed upon stationary pipe coating devices although obviously it may be mounted to make the same portable if desired. In the drawings the device is shown as being mounted upon a base made up of longitudinal beams 1, 2 and 3. These beams may be of channel iron, as shown in the drawings, if desired. Connected with the base are upright members 4 and 5 connected at their upper ends with longitudinal beams 6 and 7. The frame work thus provided serves as a support for a housing of any desired construction. In Figs. 1 and 2 there are end plates 8 and 9 having a central opening 10 therein and about the margin of this opening is a ring-shaped guard member 11. The upper portion of the housing is also enclosed by a plate 12 of sheet iron or similar material.

Fixed within the housing are circular supporting members 13 at each end which form tracks on their inner surfaces to rotatably support a frame 14 within the housing. The frame members 13 are secured to the beams 6 and 7 making up the frame work of the device and may be held in place by cap screws 15 or similar devices.

The frame 14 comprises two ring-shaped members one at each end of the rotating drum which supports the brushes. These two end rings have mounted therein a plurality of shafts 16 which project beyond the supporting rings at each end and have rotatably mounted thereon wheels 17 adapted to ride upon the rings 13 in the frame. I have shown four of these shafts, all of which have at their ends wheels 17 riding upon rings 13 and thus supporting the drum or frame so that it may be rotated upon the frames 13.

Mounted upon the shafts 16 at a point midway between the ends of said shafts is a sprocket wheel 18, said sprocket wheel being fitted between rings 19 and said rings 19 having thereon outwardly flaring guard members 20, one at each side of said wheel, as shown in Fig. 1. The sprocket wheel in rotating is thus adapted to carry with it the drum, as will be understood from the drawings.

Mounted upon the drum and extending from one shaft to the other are plates 22. As there are four of the shafts 16 uniformly spaced apart upon the drum there are also four of the plates 22 connected between said shafts and forming a rectangular brush supporting structure. The plates 22 are secured at their ends to the shafts by welding or any similar means and thus held rigidly in place. Said plates have longitudinal slots 23 therein through which projects screws 24 adapted to be adjusted by hand, each screw extending through the plate 22 and engaging an arm 25, on the inner side of said frame.

There are four arms 25, each of them having the same construction. The arms have their outer ends formed to lie against the inner sides of the plates 22 so as to be moved longitudinally of said plates to adjust the brushes toward and from the pipe. The inner ends of the arms 25 lie at right angles to the plates 22, to which they are attached, and the ends of said arms are recessed at 26 to receive brushes 27. The inner faces of the brushes are adapted to contact with the pipe 28 which is to be painted. It will be seen that each of the brushes may be moved radially toward or away from the pipe by the adjustment of the outer ends thereof longitudinally of the plates 22 upon which they are mounted.

The paint is supplied to the pipe in this embodiment through means of a pump 29 mounted at one side of the housing and adapted to be operated through a sprocket wheel 30 thereon. Said pump has a suction tube 31 extending into the tank 32 at some convenient point. The paint or coating is drawn upwardly from the tank by the pump and forced through the pipe 33 to the nozzle 34 by means of which the paint is delivered to the upper surface of the pipe. The nozzle end of the pipe may be flattened into an elongated orifice so as to deliver the paint longitudinally along the pipe.

In the operation of the device the drum may be rotated through a sprocket chain 36 from a sprocket wheel 37 mounted on the frame and rotated through any convenient source of power, not shown. The rotation of the drum will carry the same around within the frame consisting of the end track members 13 upon which the wheels 11 are adapted to roll. As the drum is rotated the brushes are carried around the pipe and the pipe is advanced longitudinally through the device. The paint will be delivered to the pipe through the nozzle 34 and the longitudinal movement of the pipe will carry it beneath the brushes 27 and said brushes will smooth it evenly upon the surface of the pipe on all sides thereof so that when the pipe issues through said machine it will have a smooth and even coating applied to the outer surface thereof. If the size of the pipe is varied the brushes may be easily adjusted so that they will bear against the pipe with the desired pressure. This adjustment has previously been described and will be understood particularly from Fig. 2.

Figure 4:
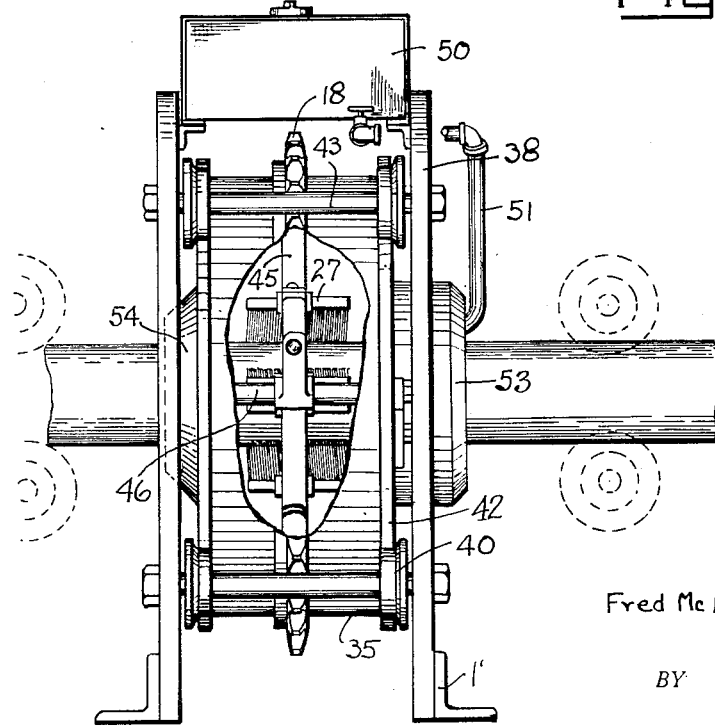

In Figs. 3 and 4 I have shown a somewhat different embodiment of the invention. In this construction there are end plates 38 having a central opening 39 therein within which the drum may rotate. The frame has mounted therein four rollers 40, the inner peripheries of which extend inwardly of the frame and furnish a support for the drum 41 therein.

Said drum 41 has end plates 42 of circular construction. These plates are mounted to bear upon the rollers 40 during the rotation of the drum. The drum in this case furnishes a support for the brushes. The brushes are, however, mounted in a somewhat different manner than are the brushes disclosed in Figs. 1 and 2. The holding members 44 for the brushes are supported upon the ends of the arms 45, which are preferably made of spring material. The outer ends of said arms are fixed upon pins 46. Said pins 46 furnish a pivot with which said arms may swing. Mounted on said pins 46 are short arms 47 which support arcuate slotted member 48, which is adapted to receive a clamping member 49. As will be understood particularly from Fig. 3, the arm 47 provides a means for adjusting the position of the brush holding arms 45. By swinging the arm 47 to or from the axis of the drum the arm 45 may be positioned to hold the brushes against the pipe. When in adjusted position the clamping nut 49 may be tightened so as to hold the brushes in adjustment. I have shown four of these arms mounted on the plates 42 at the ends of the drum and it will be obvious that the brushes may be adjusted in this modification to obtain the same result as in the first embodiment.

The paint in this device is shown as being fed by gravity, although obviously a pump may be employed as in the first embodiment. A tank 50 mounted at the upper end of the frame contains the coating composition and this is fed downwardly through a pipe 51 to the nozzle 52, which is extended inwardly at the end of the guard member 53 on the frame. The movement of the pipe through the device will carry the paint beneath the brushes 44 which will spread the paint uniformly over the surface. The guard 53 serves to catch the waste paint and prevent it from running out the end of the casing. On the opposite side of the housing from the guard 53 is a second guard member 54 which is extended inwardly toward the pipe to prevent the splashing of paint to the outside. Any paint dropping from the pipe will run into the lower side of the housing 35 and will thus be saved.

The advantages of my construction lie in its simplicity and in the ease with which the adjustments may be made in the smoothing of the paint upon the pipe. The brushes in either embodiment may be moved to accommodate different sizes of pipe with very little delay; paint or coating fed to the pipe is uniformly applied without waste.

Having thus described my invention what I claim as new and desire to protect by Letters Patent is:

1. A pipe coating device including a frame, a drum rotatable in said frame, annular plates at the ends of said drum, shafts connecting said end plates, brush supporting devices on said shafts, and brushes thereon and means to fix said brushes on said frame at various distances from said pipe.

2. A pipe coating device including a frame, a drum rotatable thereon, shafts extending longitudinally of said drum, plates connecting adjacent shafts, brush-supporting arms on said plates, and brushes on said arms.

3. A pipe coating device including a frame, a drum rotatable thereon, shafts extending longitudinally of said drum, plates connecting adjacent shafts, brush-supporting arms adjustable longitudinally on said plates, and brushes on said arms.

4. A pipe coating device including a frame, a drum rotatable thereon, shafts extending longitudinally of said drum, plates supported between adjacent shafts, arms mounted on said plates and slidable longitudinally thereon, brushes on said arms, and means to clamp said arms in adjusted position on said plates.

5. A pipe coating device including a frame, a drum rotatable thereon, shafts extending longitudinally of said drum, plates fixed between adjacent shafts transversely of said drum, arms on said plates extending inwardly tangentially of said pipe, brushes on said arms and means to adjust said arms tangentially along said plates.

6. A pipe coating device including a drum, means to support said drum rotatably about the pipe, plates mounted transversely of said drum, slots longitudinally of said plates, an arm, one end of which is slidable along one of said plates, means on said arm engaging in said slots to fix said arm in adjusted position tangentially of said pipe, and a brush on said arm contacting with said pipe.

7. A pipe coating device including a drum, means to support said drum rotatably about the pipe, plates mounted transversely of said drum, slots longitudinally of said plates, arms adjustable along said slots, said arms extending inwardly tangentially of said pipe, brushes on said arms, and means to feed paint to said pipe.

FRED McMANIS.